(12) United States Patent
Jiang et al.

(10) Patent No.: US 12,364,974 B2
(45) Date of Patent: Jul. 22, 2025

(54) PARTICULATE FILTER (71) Applicant: BASF CORPORATION, Florham Park, NJ (US)

(72) Inventors: Jun Cong Jiang, Shanghai (CN); Yun Fei Qi, Shanghai (CN); Attilio Siani, Shanghai (CN); Weiyong Tang, Shanghai (CN); Shau Lin Chen, Shanghai (CN)

(73) Assignee: BASF Corporation, Florham Park, NJ (US)

( * ) Notice: Subject to any disclaimer, the term of this patent is extended or adjusted under 35 U.S.C. 154(b) by 528 days.

(21) Appl. No.: 17/755,875

(22) PCT Filed: Nov. 10, 2020

(86) PCT No.: PCT/US2020/059806
§ 371 (c)(1),
(2) Date: May 11, 2022

(87) PCT Pub. No.: WO2021/096841
PCT Pub. Date: May 20, 2021

(65) Prior Publication Data
US 2022/0395814 A1    Dec. 15, 2022

(30) Foreign Application Priority Data

Nov. 12, 2019 (WO) ............... PCT/CN2019/117575

(51) Int. Cl.
*B01J 23/02* (2006.01)
*B01D 53/94* (2006.01)
(Continued)

(52) U.S. Cl.
CPC .......... *B01J 23/464* (2013.01); *B01D 53/945* (2013.01); *B01J 21/04* (2013.01); *B01J 23/02* (2013.01);
(Continued)

(58) Field of Classification Search
CPC .............. B01D 53/945; B01D 53/9468; B01D 2255/102; B01D 2255/1021;
(Continued)

(56) References Cited

U.S. PATENT DOCUMENTS 11,752,469 B2 *  9/2023  Chen ................... B01D 63/066
                                              55/523
11,878,263 B2 *  1/2024  Mizutani ............. C04B 38/0009
(Continued)

FOREIGN PATENT DOCUMENTS

DE    11 2013 000218 T5    8/2015
EP       2 181 749 A1      5/2010
(Continued)

OTHER PUBLICATIONS

PCT International Search Report dated Mar. 3, 2021, PCT/US2020/059806.

*Primary Examiner* — Dapinder Singh
(74) *Attorney, Agent, or Firm* — DLA Piper LLP (US)

(57) ABSTRACT

The present invention relates to a particulate filter, in particular a particulate filter for use in an emission treatment system of an internal combustion engine. The particulate filter provides an advantageous combination of low back pressure and high fresh filtration efficiency.

16 Claims, 8 Drawing Sheets

(51) Int. Cl.
*B01J 21/04* (2006.01)
*B01J 23/10* (2006.01)
*B01J 23/46* (2006.01)
*B01J 35/50* (2024.01)
*B01J 35/56* (2024.01)
*F01N 3/02* (2006.01)
*F01N 3/021* (2006.01)

(52) U.S. Cl.
CPC ............... *B01J 23/10* (2013.01); *B01J 35/50* (2024.01); *B01J 35/56* (2024.01); *F01N 3/021* (2013.01); *B01D 2255/1021* (2013.01); *B01D 2255/1023* (2013.01); *B01D 2255/1025* (2013.01); *B01D 2255/9155* (2013.01); *B01D 2255/9202* (2013.01)

(58) Field of Classification Search
CPC .... B01D 2255/1023; B01D 2255/1025; B01D 2255/9155; B01D 2255/9202; B01D 2255/9207; B01D 2258/01; B01J 21/04; B01J 21/10; B01J 23/02; B01J 23/10; B01J 23/40; B01J 23/464; B01J 23/63; B01J 35/19; B01J 35/50; B01J 35/56; B01J 35/613; B01J 37/0215; B01J 37/088; F01N 3/01; F01N 3/035; F01N 3/0222; F01N 3/0814; F01N 3/2828; F01N 3/0821; F01N 3/28; F01N 3/281; F01N 2330/06; F01N 2510/068; F01N 2250/02; F01N 2330/02; F01N 2330/00; F01N 2330/10; F01N 2330/12; F01N 2330/30; F01N 2330/60; Y02T 10/12

See application file for complete search history.

(56) References Cited

U.S. PATENT DOCUMENTS

2010/0126133 A1* 5/2010 Fekety ................... F01N 3/035
427/372.2
2013/0149458 A1* 6/2013 Cai ........................ B05D 5/005
427/140

FOREIGN PATENT DOCUMENTS

| JP | 2007-144371 | 6/2007 |
| WO | WO-2012/030533 A1 | 3/2012 |
| WO | WO-2018/115900 A1 | 6/2018 |

* cited by examiner

Particulate Filter

PARTICULATE FILTER

CROSS-REFERENCE TO RELATED APPLICATIONS

This application is a national stage filing under 35 U.S.C. § 371 of International Application No. PCT/US2020/059806, filed on Nov. 10, 2020, which claims the benefit of priority to International Application No. PCT/CN2019/117575, filed Nov. 12, 2019; the disclosure of each of these applications are each incorporated herein by reference in its entirety.

DESCRIPTION

Technical Field

The present invention relates to a particulate filter, in particular a particulate filter for use in an emission treatment system of an internal combustion engine. The particulate filter provides an advantageous combination of low back pressure and high fresh filtration efficiency.

Background

The largest portions of most internal combustion exhaust gases contain relatively benign nitrogen ($N_2$), water vapor ($H_2O$), and carbon dioxide ($CO_2$); but the exhaust gas also contains in relatively small part noxious and/or toxic substances, such as carbon monoxide (CO) from incomplete combustion, hydrocarbons (HC) from un-burnt fuel, nitrogen oxides (NOx) from excessive combustion temperatures, and particulate matter (PM).

Certain internal combustion engines, such as lean-burn engines, diesel engines, natural gas engines, power plants, incinerators, or gasoline engines, tend to produce an exhaust gas with a considerable amount of soot and other particulate matter. Particulate matter emissions can be remedied by passing the PM-containing exhaust gas through a particulate filter.

Diesel particulate filters have proven to be extremely efficient at removing carbon soot from the exhaust of diesel engines. The most widely used diesel particulate filter is the wall-flow filter which filters the diesel exhaust by capturing the soot on the porous walls of the filter body. The wall-flow filter is designed to provide for nearly complete filtration of soot without significantly hindering the exhaust flow.

As the layer of soot collects on the surfaces of the inlet sides of the filter, the lower permeability of the soot layer causes a pressure drop across the filter and a gradual rise in the back pressure of the filter against the engine, causing the engine to work harder, thus affecting engine operating efficiency. Eventually, the pressure drop becomes unacceptable and regeneration of the filter becomes necessary.

Particulate emissions for gasoline engines are being subject to regulations, including Euro 6 (2014) standards. Certain gasoline direct injection (GDI) engines have been developed whose operating regimes result in the formation of fine particulates. Aftertreatment systems for gasoline engines need to achieve particulate matter standards. In contrast to particulates generated by diesel lean burning engines, the particulates generated by gasoline engines, such as GDI engines, tend to be finer and in lesser quantities. This is due to the different combustion conditions of a diesel engine as compared to a gasoline engine. For example, gasoline engines run at a higher temperature than diesel engines. Also, hydrocarbon components are different in the emissions of gasoline engines as compared to diesel engines.

Original equipment manufacturers (OEMs), i.e. the vehicle manufacturers, require gasoline particulate filters (GPFs) to have high fresh filtration efficiency and low backpressure. However, as there is little engine-out particulate mass and exhaust gas with higher temperature from a gasoline engine, soot cake generated during the pre-conditioning of the aftertreatment system before testing is often negligible. This soot cake is responsible at least in part for the high filtration efficiency of diesel particulate filters, and with a diesel engine an effective soot cake can be formed in 10-20 km of driving. As this effect is not generally achievable with a gasoline engine, the target fresh filtration efficiency is met by using a higher washcoat loading and this increases the pressure drop across the part. This consideration only applies to fresh parts in order to satisfy a requirement for an end-of-line test at the OEM.

WO2012030533 A1 relates to a method of forming a porous discriminating layer on a ceramic support having at least one porous wall comprising (a) establishing a flow of a gas stream containing particle agglomerates through said at least one porous wall from a gas entry side of said at least one porous wall to a gas outlet side of said at least one porous wall, such that at least a portion of the agglomerates deposit to form a deposited layer of the agglomerates, their constituent particles or both on the gas entry side of said at least one porous wall, wherein (1) at least a portion of the particles that make up the particle agglomerates are of a ceramic material or precursor to a ceramic material, (2) the particles that make up the particle agglomerates have a size from 0.01 to 5 microns (μm), (3) the agglomerates have a size of from 10 to 200 microns and (4) said deposited layer extends only partially through the thickness of said at least one porous wall and (b) calcining said deposited layer to form the discriminating layer.

WO2018115900 A1 relates to a particulate filter for use in an emission treatment system of a gasoline engine, the filter having an inlet side and an outlet side, wherein at least the inlet side is loaded with a synthetic ash.

On Dec. 23, 2016, the Ministry of Environmental Protection (MEP) of the People's Republic of China published the final legislation for the China 6 limits and measurement methods for emissions from light-duty vehicles (GB18352.6—2016; hereafter referred to as China 6), which is much stricter than the China 5 emission standard. Especially, China 6b incorporates limits on particulate matter (PM) and adopts the on-board diagnostic (OBD) requirements. Furthermore, it is implemented that vehicles should be tested under World Harmonized Light-duty Vehicle Test Cycle (WLTC). WLTC includes many steep accelerations and prolonged high-speed requirements, which demand high power output that could have caused "open-loop" situation (as fuel paddle needs to be pushed all the way down) at extended time (e.g., >5 sec) under rich (lambda <1) or under deep rich (lambda <0.8) conditions. Albeit standards become more stringent, it is desirable to provide a further improved particulate filter providing an advantageous combination of lower back pressure and higher fresh filtration efficiency.

SUMMARY

The present invention relates to a particulate filter, in particular a particulate filter for use in an emission treatment system of an internal combustion engine.

Aspects include particulate filters for exhaust gas treatment from an internal combustion engine comprising: a particulate filter, the filter having an inlet side and an outlet side; a functional material layer coated onto the inlet side, the outlet side, or both sides of the particulate filter.

Other aspects include methods for the treatment of exhaust gas from an internal combustion engine comprising: providing a particulate filter; and flowing the exhaust gas from the engine through the particulate filter.

BRIEF DESCRIPTION OF DRAWINGS

FIG. 1 (a) and FIG. 1 (b) show an exemplary wall-flow filter;

FIG. 2 (a) and FIG. 2 (b) show the morphology of high surface area gamma alumina in its powder form at different scales in SEM images;

FIG. 3 (a) and FIG. 3 (b) show the morphology of low surface area boehmite alumina in its powder form at different scales in SEM images;

FIG. 6 (a) and FIG. 6 (b) show the morphology of low surface area magnesium oxide in its powder form at different scales in SEM images;

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

With respect to the terms used in this disclosure, the following definitions are provided.

Throughout the description, including the claims, the term "comprising one" or "comprising a" should be understood as being synonymous with the term "comprising at least one", unless otherwise specified, and "between" or "to" should be understood as being inclusive of the limits.

The terms "a", "an" and "the" are used to refer to one or to more than one (i.e., to at least one) of the grammatical object of the article.

The term "and/or" includes the meanings "and", "or" and also all the other possible combinations of the elements connected to this term.

All percentages and ratios are mentioned by weight unless otherwise indicated.

Thus, according to one aspect of the invention, provided is a particulate filter for exhaust gas treatment from an internal combustion engine comprising:
(1) a particulate filter, the filter having an inlet side and an outlet side;
(2) a functional material layer coated onto the inlet side, the outlet side, or both sides of the particulate filter.

In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. The particulate filter is typically formed of a porous substrate. The porous substrate may comprise a ceramic material such as, for example, cordierite, silicon carbide, silicon nitride, zirconia, mullite, spodumene, alumina-silica-magnesia, zirconium silicate, and/or aluminium titanate, typically cordierite or silicon carbide. The porous substrate may be a porous substrate of the type typically used in emission treatment systems of internal combustion engines.

The internal combustion engine may be a lean-burn engine, a diesel engine, a natural gas engine, a power plant, an incinerator, or a gasoline engine.

The porous substrate may exhibit a conventional honeycomb structure. The filter may take the form of a conventional "through-flow filter". Alternatively, the filter may take the form of a conventional "wall flow filter" (WFF). Such filters are known in the art.

Figure 1:
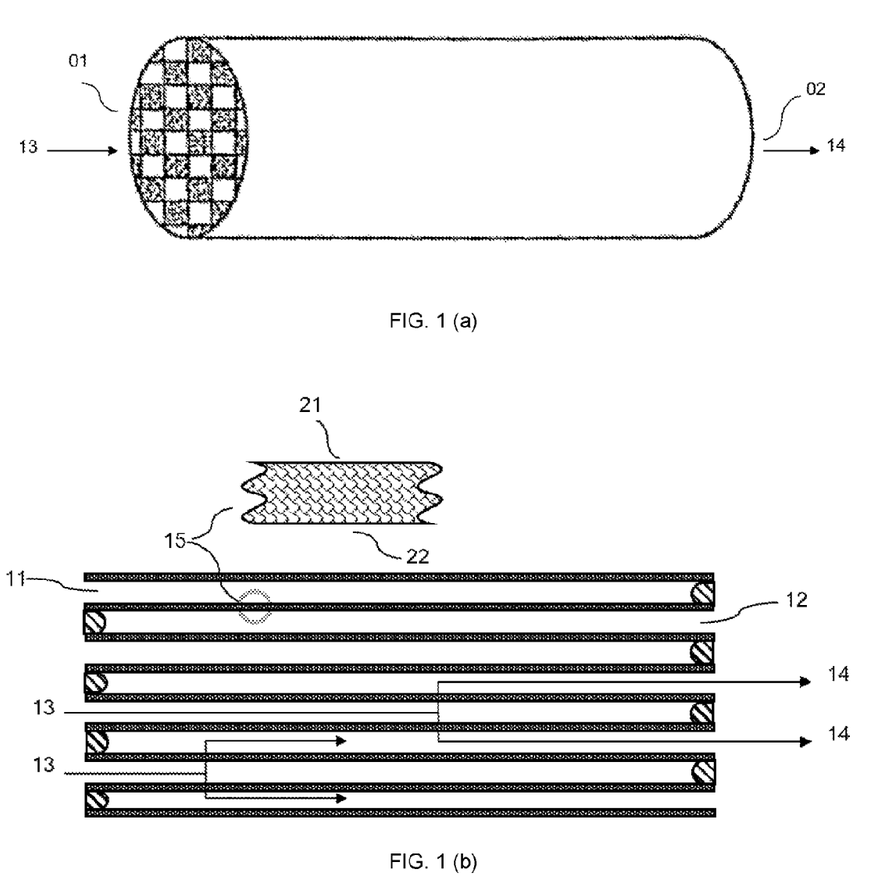

The particulate filter is preferably a wall-flow filter. Referring to FIG. 1 (a) and FIG. 1 (b), an exemplary wall-flow filter is provided. Wall-flow filters work by forcing a flow of exhaust gases (13) (including particulate matter) to pass through walls formed of a porous material.

A wall flow filter typically has a first face and a second face defining a longitudinal direction therebetween. In use, one of the first face and the second face will be the inlet face for exhaust gases (13) and the other will be the outlet face for the treated exhaust gases (14). A conventional wall flow filter has first and second pluralities of channels extending in the longitudinal direction. The first plurality of channels (11) is open at the inlet face (01) and closed at the outlet face (02). The second plurality of channels (12) is open at the outlet face (02) and closed at the inlet face (01). The channels are preferably parallel to each other to provide a constant wall thickness between the channels. As a result, gases entering one of the plurality of channels from the inlet face cannot leave the monolith without diffusing through the channel walls (15) from the inlet side (21) to the outlet side (22) into the other plurality of channels. The channels are closed with the introduction of a sealant material into the open end of a channel. Preferably the number of channels in the first plurality is equal to the number of channels in the second plurality, and each plurality is evenly distributed throughout the monolith. Preferably, within a plane orthogonal to the longitudinal direction, the wall flow filter has from 100 to 500 channels per square inch, preferably from 200 to 400. For example, on the inlet face (01), the density of open channels and closed channels is from 200 to 400 channels per square inch. The channels can have cross sections that are rectangular, square, circular, oval, triangular, hexagonal, or other polygonal shapes.

In one or more embodiments, the inlet side (21) of the porous walls of the particulate filter is coated with the functional material layer. The functional material layer may be coated on the outlet side (22) of the porous walls of the filter, or both sides (21 and 22). The loading may be characterized as "on wall" loading or "in wall" loading. The former is characterized by the formation of a functional material layer on a surface of the porous walls (15). The latter is characterized by extending partial of the functional material thorough the thickness of the porous walls (15).

In one or more embodiments, the functional material layer comprises:

(1) a first inorganic material comprises one or more of alumina, zirconia, ceria, silica, titania, a rare earth metal oxide other than ceria; and (2) a second inorganic material comprises one or more of alumina, zirconia, ceria, silica, titania, magnesium oxide, zinc oxide, manganese oxide, silicate zeolite, alumino silicate zeolite. In specific embodiments, the first and second inorganic materials are mixed homogeneously, layered or zoned.

In one or more embodiments, the functional material layer further comprises a first platinum group metal (PGM) selected from the group consisting of platinum (Pt), palladium (Pd) and rhodium (Rh), and mixtures thereof. The PGM is present in a catalytically effective amount to convert NOx, CO and hydrocarbons in an exhaust gas to $N_2$, $CO_2$ and $H_2O$ and to cause the oxidation of particulate matter trapped on the particulate filter.

In one or more embodiments, the functional material layer further comprises at least one organic material, such as acetic acid, oxalic acid, citric acid, tartaric acid, fumaric acid, lactic acid, malic acid, maleic acid, hexanol, octanol, decanol, cellulose, hydroxylethyl cellulose, methylhydroxylethyl cellulose, starch, polyethylene, polypropylene, polystyrene, poly(oxyethylene), poly(ethylene terephthalate), poly(butylene terephthalate), polyvinyl chloride, polyvinyl alcohol, polyvinylpyrrolidone, polymethyl methacrylate, polyamide, polycarbonates, or polyurethanes.

In one or more embodiments, the second inorganic material has a $D_{90}$ of between 50 to 400 μm, preferably between 100 to 300 μm.

In one or more embodiments, the second inorganic material has a $D_{50}$ of between 10 to 200 μm, preferably between 50 to 150 μm.

In one or more embodiments, the second inorganic material has a $D_{10}$ of between 3 to 40 μm, preferably between 5 to 20 μm.

In one or more embodiments, the first inorganic material has a $D_{90}$ of 1 to 50 μm, preferably 3.5 to 20 μm, and more preferably a $D_{90}$ of 4 to 10 μm.

In one or more embodiments, the first inorganic material has a $D_{50}$ of 1.2 to 8 μm, preferably 1.8 to 6 μm.

In one or more embodiments, the first inorganic material has a $D_{10}$ of 0.6 to 2.2 μm, preferably 0.8 to 1.5 μm.

"$D_{90}$", "$D_{50}$" and "$D_{10}$" have their usual meaning of referring to the point where the cumulative weight from the small-particle-diameter side reaches 90%, 50% and 10% in the cumulative particle size distribution. $D_{90}$ is the value determined by measuring the particle size distribution, respectively. The particle size distribution is measured by using laser diffraction particle size distribution analyzer.

In one or more embodiments, the loading of the second inorganic material is between 0.05 and 5 g/L, preferably between 0.1 and 2 g/L, and more preferably between 0.15 and 1 g/L.

In one or more embodiments, the second inorganic material has a bulk density of 0.5 to 1 g/cm$^3$.

In one or more embodiments, the weight percentage of second inorganic material in the functional material layer is between 1 and 25%, preferably between 5 and 20%.

In one or more embodiments, the functional material may be coated in a particulate form. In preferably embodiments, the functional material is coated in a particulate form via gas phase carrier, i.e. "dry coated" without the use of any liquid carrier. In other embodiments the functional material may be coated in the form of a liquid suspension.

Once coated, the functional material may take the form of a packed bed. For example, when the particulate filter is a wall flow filter, the functional material may form a packed bed against the walls of the plurality of channels open at the inlet side. The packed bed may be formed in the channels open at the inlet side and against the sealant material closing the channels, i.e. towards the outlet end of the inlet channels. The packed bed is typically porous and is typically gas permeable, the pores being sized to trap particulate matter in an internal combustion exhaust, for example soot. The pores of the packed bed are typically smaller than the pores of the porous substrate of the particulate filter. Alternatively, or in addition, the packed bed may be more porous than the walls of the porous substrate (i.e. it may provide a high level of filtration by the provision of a long path length). The packed bed may extend along the walls of the plurality of channels open at the inlet side. The packed bed may take the form of a layer or membrane, for example a continuous layer or membrane. The packed bed may extend along the entire length of the walls of the plurality of channels, or along only part of the length of the walls. Instead of being a packed bed, the functional material may be in the form of a porous coating, e.g. a coating applied as (i.e. derived from) a washcoat slurry. The porous coating may be arranged in a wall flow filter in a similar manner to the packed bed discussed above.

In one or more embodiments, the particulate filter further comprises a porous body comprising a plurality of pores, and further comprises a catalytic washcoat within at least a portion of the plurality of pores. The use of the catalytic washcoat may serve to treat components of an internal combustion exhaust gas such as, for example, unburned hydrocarbons, carbon monoxide and/or nitrogen oxide. The catalytic washcoat comprises one or more of a selective catalytic reduction (SCR) catalyst, a diesel oxidation catalyst (DOC), a three-way conversion (TWC) catalyst, an AMOx catalyst, a NOx trap, a NOx absorber catalyst, a hydrocarbon trap catalyst. The catalytic washcoat is typically distributed substantially throughout the plurality of pores. The catalytic washcoat is applied to the particulate filter prior to application of the functional material layer. The catalytic washcoat can be present as a separate coating on the particulate filter or the catalytic washcoat can be integral with the particulate filter, e.g. either the catalytic washcoat can be impregnated as a solution or slurry into the material of a virgin particulate filter, or the catalytic washcoat can be combined with ingredients that form a structure of the substrate monolith that is then extruded into a flow-through monolith and, following drying and calcination, alternate ends of the channels are blocked in a chequer board pattern arrangement at one end of the substrate monolith and unblocked channels are alternately blocked at the opposite end thereof in a similar arrangement. This latter arrangement requires that the porosity of the extrudate following drying and calcination is sufficient to function as a wall-flow filter, i.e. the porosity of the substrate monolith is at least 40%, such as at least 45%, e.g. 50% or at least 55% or up to 75%.

As used herein, the terms of "selective catalytic reduction" and "SCR" refer to the catalytic process of reducing oxides of nitrogen to dinitrogen ($N_2$) using a nitrogenous reductant. The SCR catalyst may include at least one material selected front: MOR; USY; ZSM-5; ZSM-20; beta-zeolite; CHA; LEV; AEI; AFX; FER; SAPO; ALPO; vanadium; vanadium oxide; titanium oxide; tungsten oxide; molybdenum oxide; cerium oxide; zirconium oxide; niobium oxide; iron; iron oxide; manganese oxide; copper; molybdenum; tungsten; and mixtures thereof. The support structures for the active components of the SCR catalyst may include any suitable zeolite, zeotype, or non-zeolitic compound. Alternatively, the SCR catalyst may include a metal, a metal oxide, or a mixed oxide as the active component. Transition metal loaded zeolites (e.g., copper-chabazite, or Cu-CHA, as well as copper-levyne, or Cu-LEV, as well as Fe-Beta) and zeotypes (e.g., copper-SAPO, or Cu-SAPO) are preferred.

As used herein, the terms of "three-way conversion" and "TWC" refer to a catalytic process that can substantially eliminate HC, CO and NOx from gasoline engine exhaust gases. Typically, a TWC catalyst mainly comprises a platinum group metal (PGM), an oxygen storage component (OSC), and a refractory metal oxide support.

As used herein, the terms of "platinum group metal" and "PGM" refer to one or more chemical elements defined in the Periodic Table of Elements, including platinum, palladium, rhodium, osmium, iridium, and ruthenium, and mixtures thereof.

In some embodiments, the platinum group metal component of the TWC catalyst is selected from platinum, palladium, rhodium, or mixtures thereof. In specific embodiments, the platinum group metal component of the TWC catalyst comprises palladium.

In some embodiments, the TWC catalyst does not comprise an additional platinum group metal (i.e., the TWC comprises only one platinum group metal). In other embodiments, the TWC catalyst comprises an additional platinum group metal. In one or more embodiments, when present, the additional platinum group metal is selected from platinum, rhodium, and mixtures thereof. In specific embodiments, the additional platinum group metal component comprises rhodium. In one or more specific embodiments, the TWC catalyst comprises a mixture of palladium and rhodium. In other embodiments, the TWC catalyst comprises a mixture of platinum, palladium, and rhodium.

As used herein, the terms of "oxygen storage component" and "OSC" refer to an entity that has a multi-valence state and can actively react with reductants such as CO or hydrogen under reduction conditions and then react with oxidants such as oxygen or nitrogen oxides under oxidative conditions. Examples of oxygen storage components include rare earth oxides, particularly ceria, lanthana, praseodymia, neodymia, niobia, europia, samaria, ytterbia, yttria, zirconia, and mixtures thereof in addition to ceria. The rare earth oxide may be in bulk (e.g. particulate) form. The oxygen storage component can include ceria in a form that exhibits oxygen storage properties. The lattice oxygen of ceria can react with carbon monoxide, hydrogen, or hydrocarbons under rich A/F conditions. In one or more embodiments, the oxygen storage component for the TWC catalyst comprises a ceria-zirconia composite or a rare earth-stabilized ceria-zirconia.

As used herein, the terms of "refractory metal oxide support" and "support" refer to underlying high surface area material upon which additional chemical compounds or elements are carried. The support particles have pores larger than 20 A and a wide pore distribution. As defined herein, such supports, e.g., metal oxide supports, exclude molecular sieves, specifically, zeolites. In particular embodiments, high surface area refractory metal oxide supports can be utilized, e.g., alumina support materials, also referred to as "gamma alumina" or "activated alumina," which typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa, and theta alumina phases. Refractory metal oxides other than activated alumina can be used as a support for at least some of the catalytic components in a given catalyst. For example, bulk ceria, zirconia, alpha alumina, silica, titania, and other materials are known for such use.

In some embodiments, the refractory metal oxide supports for the TWC catalyst independently comprise a compound that is activated, stabilized, or both, selected from the group consisting of alumina, zirconia, alumina-zirconia, lanthana-alumina, lanthana-zirconia-alumina, alumina-chromia, ceria, alumina-ceria, and combinations thereof.

As used herein, the terms of "diesel oxidation catalyst" and "DOC" refer to diesel oxidation catalysts, which are well-known in the art. Diesel oxidation catalysts are designed to oxidize CO to $CO_2$ and gas phase HC and an organic fraction of diesel particulates (soluble organic fraction) to $CO_2$ and $H_2O$. Typical diesel oxidation catalysts include platinum and optionally also palladium on a high surface area inorganic oxide support, such as alumina, silica-alumina, titania, silica-titania, and a zeolite. As used herein, the term includes a DEC (Diesel Exotherm Catalyst) with creates an exotherm.

As used herein, the terms of "ammonia oxidation catalyst" and "AMOx" refer to catalysts comprise at least a supported precious metal component, such as one or more platinum group metals (PGMs), which is effective to remove ammonia from an exhaust gas stream. In specific embodiments, the precious metal may include platinum, palladium, rhodium, ruthenium, iridium, silver or gold. In specific embodiments, the precious metal component includes physical mixtures or chemical or atomically-doped combinations of precious metals.

The precious metal component is typically deposited on a high surface area refractory met-al oxide support. Examples of suitable high surface area Refractory Metal Oxides include alumina, silica, titania, ceria, and zirconia, magnesia, barium oxide, manganese oxide, tungsten oxide, and rear earth metal oxide rear earth metal oxide, base metal oxides, as well as physical mixtures, chemical combinations and/or atomically-doped combinations there-of.

As used herein, the terms of "NOx adsorbed catalyst" and "NOx trap (also called Lean NOx trap, abbr. LNT)" refer to catalysts for reducing oxides of nitrogen (NO and $NO_2$) emissions from a lean burn internal combustion engine by means of adsorption. Typical NOx trap includes alkaline earth metal oxides, such as oxides of Mg, Ca, Sr and Ba, alkali metal oxides such as oxides of Li, Na, K, Rb and Cs, and rare earth metal oxides such as oxides of Ce, La, Pr and Nd in combination with precious metal catalysts such as platinum dispersed on an alumina support have been used in the purification of exhaust gas from an internal combustion engine. For NOx storage, baria is usually preferred because it forms nitrates at lean engine operation and releases the nitrates relatively easily under rich conditions.

As used herein, the term of "hydrocarbon trap" refers to catalysts for trapping hydrocarbons during cold operation periods and releasing them for oxidation during higher-temperature operating periods. The hydrocarbon trap may be provided by one or more hydrocarbon (HC) storage components for the adsorption of various hydrocarbons (HC). Typically, hydrocarbon storage material having minimum interactions of precious metals and the material can be used, e.g., a micro-porous material such as a zeolite or zeolite-like material. Preferably, the hydrocarbon storage material is a zeolite. Beta zeolite is particularly preferable since large pore opening of beta zeolite allows hydrocarbon molecules of diesel derived species to be trapped effectively. Other zeolites such as faujasite, chabazite, clinoptilolite, mordenite, silicalite, zeolite X, zeolite Y, ultrastable zeolite Y, ZSM-5 zeolite, offretite, can be used in addition to the beta zeolite to enhance HC storage in the cold start operation.

Other aspects include methods for the treatment of exhaust gas from an internal combustion engine comprising:
(1) providing a particulate filter described herein, and
(2) flowing the exhaust gas from the engine through the particulate filter.

In one or more embodiments, the particulate filter is canned. In an alternative embodiment, the filter is uncanned. Being "canned" means that the particulate filter has been incorporated into a housing for incorporation into an emission treatment system.

Being "uncanned" means that the particulate filter has not yet been incorporated into a housing for incorporation into an emission treatment system but is still coated with the functional material layer. In a typical canning process, the particulate filter is sleeved in a support mat, typically formed of ceramic fibers or alumina fibers, before being incorporated into a metal housing. Methods of incorporating the particulate filter into a metal housing include, for example, "clam-shell", "stuffing and "tourniquet" techniques. Such techniques are known in the art.

It is surprisingly found that when incorporated into an emission treatment system of a internal combustion engine, the particulate filter exhibits a combination of high fresh filtration efficiency and a reduced increase in backpressure.

EXAMPLES

The present invention is more fully illustrated by the following examples, which are set forth to illustrate the present invention and is not to be construed as limiting thereof. Un-less otherwise noted, all parts and percentages are by weight, and all weight percentages are expressed on a dry basis, meaning excluding water content, unless otherwise indicated. In each of the examples, the carrier was cordierite. The SEM images of the inorganic material powders were taken by Zeiss Supra 55.

Example 1—Comparative

A gasoline particulate filter was obtained from Corning, the filter substrate had a size of 100 mm (D)*120 mm (L), a volume of 0.94 L (57 in$^3$), a cell density of 300 cells per square inch, a wall thickness of approximately 200 µm, a porosity of 65% and a mean pore size of 20 µm in diameter by mercury intrusion measurements. The filter was uses as comparative sample without any treatment.

Example 2

A gasoline particulate filter according to Example 1, onto which a functional layer was applied into the inlet side of the filter.

Figure 2:
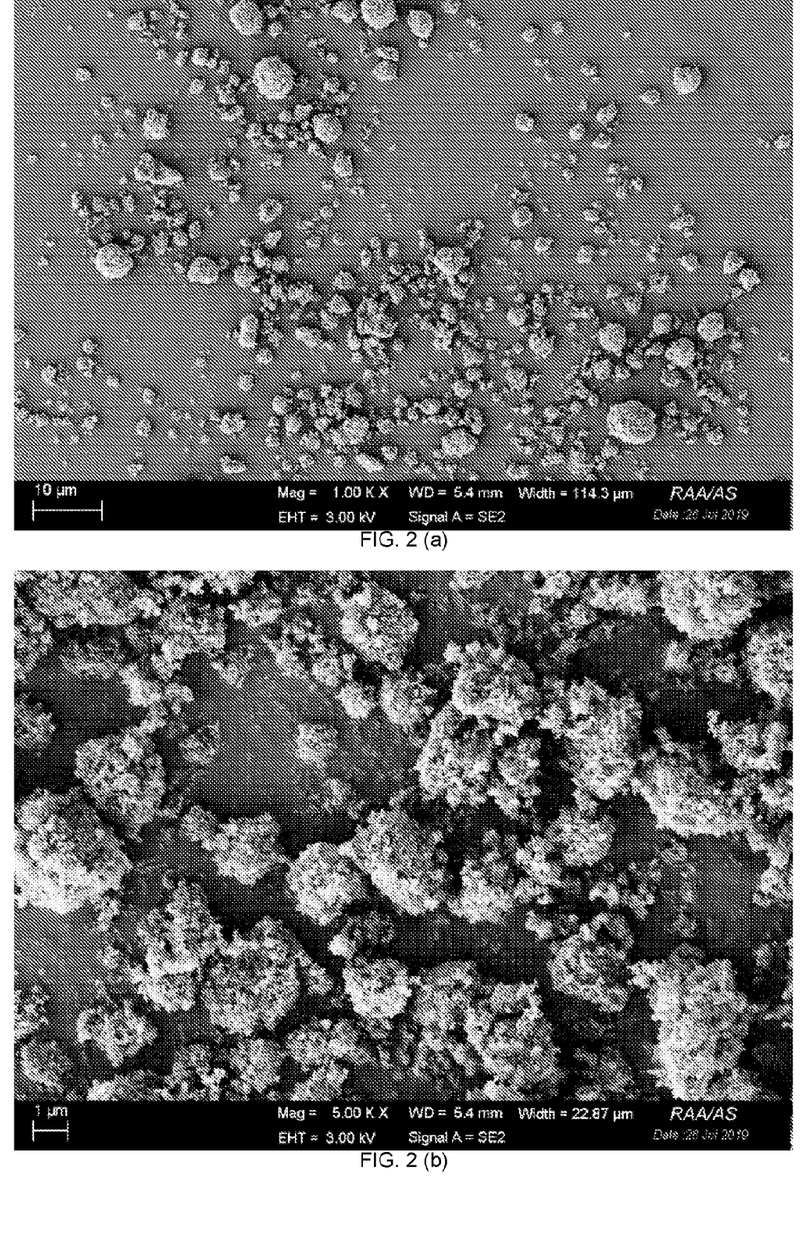

The functional material layer applied was a high surface area gamma alumina. The alumina was dry milled to a particle size of 90% being 5 microns, 50% being 2.5 microns, and 10% being 1 micron, of which the specific surface area (BET model, 77K nitrogen adsorption measurement) is 70 m$^2 \cdot$g$^{-1}$ after 4 hr calcination in air at 1000° C. The high surface area gamma alumina, in powder form, as shown in FIG. 2 (a) and FIG. 2 (b), was mixed with gas carrier and blown-in into the part at room temperature. The flow rate of gas carrier is 750 kg/hr. The loading of the functional material layer was 0.123 g/in$^3$.

After coating, the filter plus the inlet functional material layer were dried and then calcined at a temperature of 450° C. for about 30 minutes.

Example 3

A gasoline particulate filter according to Example 1, onto which a functional layer was applied into the inlet side of the filter.

Figure 3:
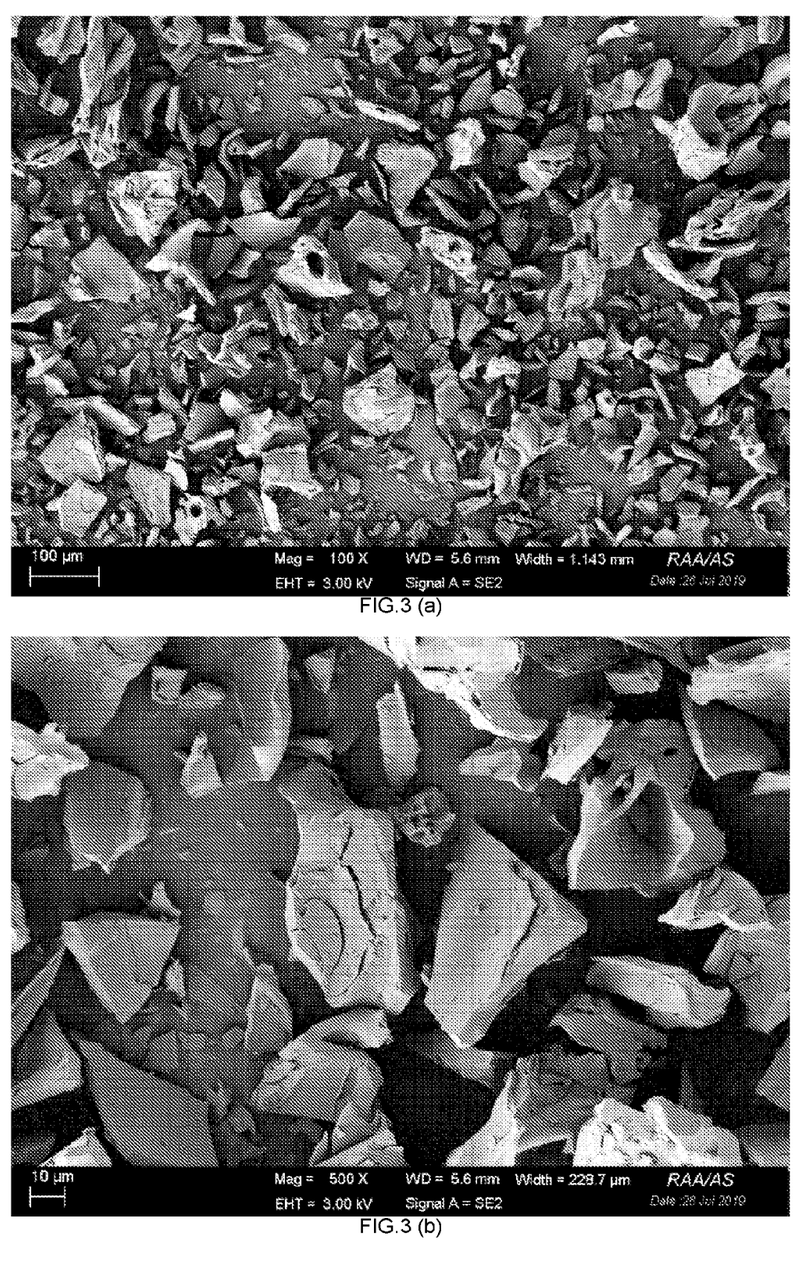

The functional material layer applied composed of a high surface area gamma alumina and a low surface area boehmite alumina. The high surface area gamma alumina was described in Example 2. And the low surface area boehmite alumina, as shown in FIG. 3 (a) and FIG. 3 (b), had a particle size of 90% being 200 microns, 50% being 70 microns, and 10% being 10 microns, of which the specific surface area (BET model, 77K nitrogen adsorption measurement) is 10 m$^2 \cdot$g$^{-1}$ after 4 hr calcination in air at 1000° C. The functional material layer was mixed with gas carrier and blown-in into the filter at room temperature. The flow rate of gas carrier is 750 kg/hr. Total loading of the functional material layer was 0.123 g/in$^3$, and the weight ratio between high surface area gamma alumina and low surface area boehmite alumina was 18:1.

After coating, the filter plus the inlet functional material layer were dried and then calcined at a temperature of 450° C. for about 30 minutes.

Example 4

A gasoline particulate filter according to Example 3, where the total loading of the functional material layer was 0.123 g/in$^3$, and the weight ratio between high surface area gamma alumina and low surface area boehmite alumina was 7.3:1.

Example 5

A gasoline particulate filter according to Example 3, where the total loading of the functional material layer was 0.123 g/in$^3$, and the weight ratio between high surface area gamma alumina and low surface area boehmite alumina was 4:1.

Example 6

A gasoline particulate filter according to Example 3, where the total loading of the functional material layer was 0.123 g/in$^3$, and the functional material layer is solely composing of low surface area boehmite alumina.

Example 7—Testing

Figure 4:
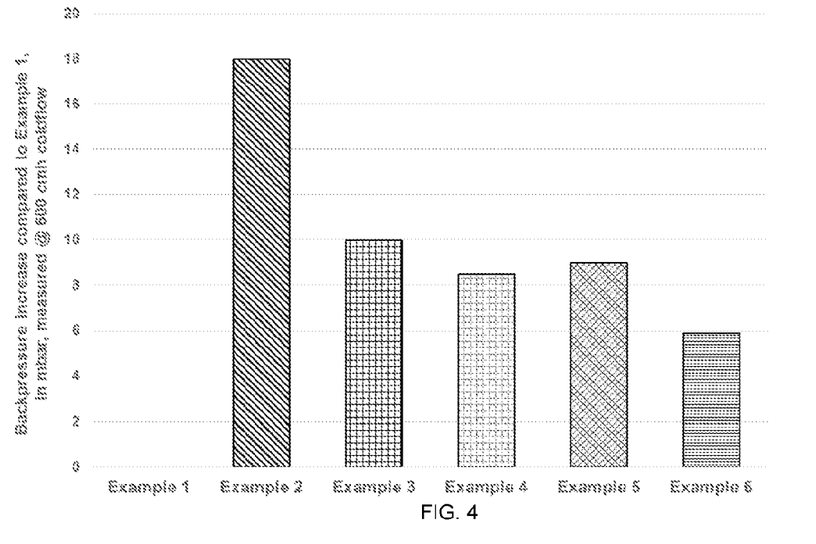
FIG. 4 shows a plot of backpressure characteristics of coated particulate filters according to embodiments of the present invention and a comparative particulate filter.

Backpressure characteristics of the above coated gasoline particulate filter examples (Examples 1 to 6) were investigated under cold air-flow at 600 cubic meter per hour (cmh). The results are shown in FIG. 4. Filters applied with the functional material layer exhibited slight increase in backpressure compared to a prior-art bare gasoline particulate filter; Nevertheless, introduction of low surface area boehmite alumina with larger size particles significantly decreased the backpressure of the coated filters, as shown in Examples 3 to 6.

Figure 5:
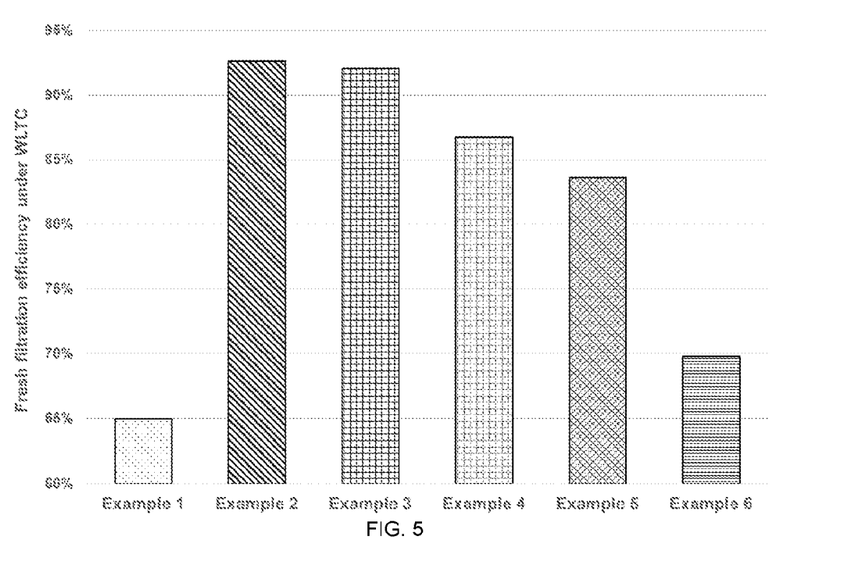
FIG. 5 shows a plot of filtration efficiencies of coated gasoline particulate filters according to embodiments of the present invention and a comparative particulate filter.

The filtration efficiencies of the above coated gasoline particulate filter examples at fresh state (0 km, or out-of-box state) were measured in the first close-coupled position (SGE 1.5 L turbo gasoline direct injection engine; WLTC testing; PN engine out=3.5×10$^{12}$ #/km), and the results are shown in FIG. 5. All coated gasoline particulate filter applied with the functional material layer exhibited significant increase in fresh filtration efficiency compared to a prior-art filter in which no functional material layer had been applied onto. Noticeably, with increasing ratio of low surface area boehmite alumina with larger size particles in the functional material layer, the fresh filtration efficiency value was initially retained (Example 3 with ~5.3% boehmite alumina) and then quickly decreased (Examples 4 to 6).

Example 8—Comparative

A gasoline particulate filter having a catalytic material was prepared using a single coat from inlet side. The prior art three-way conversion (TWC) catalyst composite contained palladium and rhodium with a total precious metal loading of 7 g/ft$^3$ and with a Pt/Pd/Rh ratio of 0/2/5. The substrate had a volume of 2.5 L (151 in$^3$), a cell density of 300 cells per square inch, a wall thickness of approximately 200 μm, and a porosity of 63% and mean pore size of 19 μm in diameter by mercury intrusion measurements. The coat was prepared as follows:

The component applied from inlet side was a high surface area gamma alumina, a ceria-zirconia composite with 40% ceria by weight as oxygen storage component, palladium, rhodium, barium oxide and zirconia oxide, at concentrations of approximately 24.8%, 68.7%, 0.1%, 0.2%, 5.0% & 1.3%, respectively, based on the calcined weight of the catalyst. The barium oxide was introduced as a hydroxide solution. The zirconium oxide was introduced as a nitrate solution. The total loading of the coat was 1.23 g/in$^3$.

Rhodium in the form of a rhodium nitrate solution was impregnated by planetary mixer (P-mixer) onto the high surface area gamma alumina and the ceria zirconia composite to form a wet powder while achieving incipient wetness. Palladium in the form of a palladium nitrate solution was impregnated by planetary mixer (P-mixer) onto the high surface area gamma alumina and the ceria zirconia composite to form a wet powder while achieving incipient wetness. An aqueous slurry was formed. The barium solution and the zirconium solution were added. The slurry was milled to a particle size of 90% being 5 microns. The slurry was then coated onto the inlet side of the wall flow cordierite filter using deposition methods known in the art. After coating, the filter plus the inlet coat were dried and then calcined at a temperature of 550° C. for about 1 hour.

Example 9

A catalyzed gasoline particulate filter according to Example 8, where the prior art three-way conversion (TWC) catalyst composite was the major catalytic layer and an additional functional material layer was loaded into the inlet side of the filter.

The functional material layer applied composed of a high surface area gamma alumina and a low surface area boehmite alumina, as described in previous examples (Examples 2 & 3). The functional material layer was mixed with gas carrier and blown-in into the filter at room temperature. The flow rate of gas carrier is 750 kg/hr. Total loading of the functional material layer was 0.052 g/in$^3$, and the weight ratio between high surface area gamma alumina and low surface area boehmite alumina was 8:1. After coating, the filter plus the inlet functional material layer were dried and then calcined at a temperature of 450° C. for about 30 minutes.

Example 10

Figure 6:
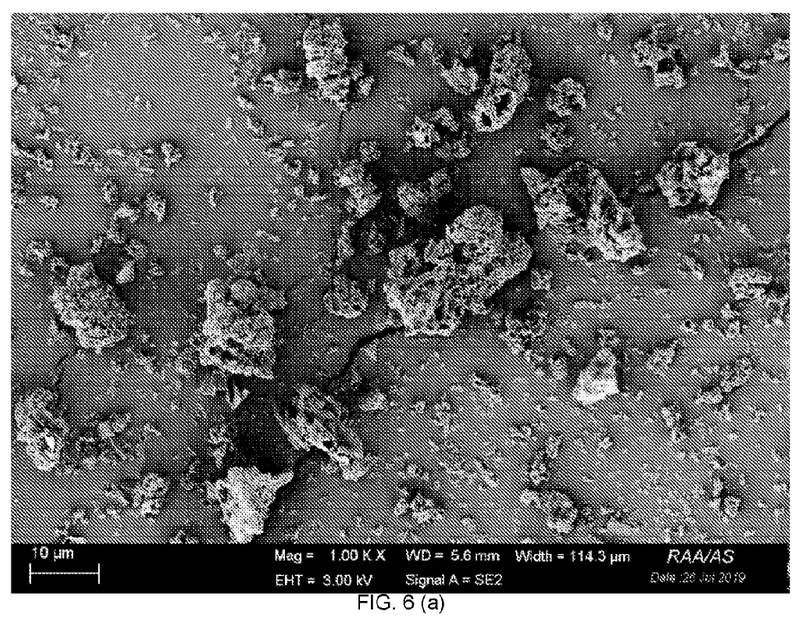

A catalyzed gasoline particulate filter according to Example 10, where the functional material layer applied composed of a high surface area gamma alumina (as of previous examples) and a low surface area magnesium oxide. This low surface area magnesium oxide, as shown in FIG. 6 (a) and FIG. 6 (b), had a particle size of 90% being 20 microns, 50% being 8 microns, and 10% being 2 microns, of which the specific surface area (BET model, 77K nitrogen adsorption measurement) is 18 m$^2$·g$^{-1}$ after 4 hr calcination in air at 1000° C. The functional material layer was mixed with gas carrier and blown-in into the filter at room temperature. The flow rate of gas carrier is 750 kg/hr. Total loading of the functional material layer was 0.052 g/in$^3$, and the weight ratio between high surface area gamma alumina and low surface area boehmite alumina was 8:1. After coating, the filter plus the inlet functional material layer were dried and then calcined at a temperature of 450° C. for about 30 minutes.

Example 11

A catalyzed gasoline particulate filter according to Example 8, where the prior art three-way conversion (TWC) catalyst composite was the major catalytic layer and an additional functional material layer was loaded into the inlet side of the filter.

The functional material layer applied composed of a PGM containing high surface area ceria-alumina and a low surface area boehmite alumina (as used in Example 9). The high surface area ceria-alumina composite is composing of 49.3% ceria, 49.3% alumina, 1.1% of platinum and 0.3% of palladium, based on calcined weight of the powder. Platinum in the form of an amine-complex solution was impregnated by planetary mixer (P-mixer) onto the high surface area ceria-alumina composite followed by palladium in the form of a palladium nitrate solution to form a wet powder while achieving incipient wetness. This powder was then calcined at a temperature of 550° C. for about 2 hours and was dry milled to a particle size of 90% being 5.1 microns, 50% being 2.1 microns, and 10% being 0.8 micron, of which the specific surface area (BET model, 77K nitrogen adsorption measurement) is 66 m$^2$·g$^{-1}$ after 4 hr calcination in air at 1000° C. This PGM containing high surface area ceria-alumina composite and the low surface area boehmite alumina, in powder form, is mixed with gas carrier and blown-in into the filter at room temperature. The flow rate of gas carrier is 750 kg/hr. Total loading of the functional material layer was 0.052 g/in$^3$, and the weight ratio between high surface area gamma alumina and low surface area boehmite alumina was 8:1. After coating, the filter plus the inlet functional material layer were dried and then calcined at a temperature of 450° C. for about 30 minutes.

Example 12

A catalyzed gasoline particulate filter according to Example 11, where the functional material layer applied composed of the PGM containing high surface area ceria-alumina (as described in Example 11) and the low surface area magnesium oxide (as described in Example 10).

Example 13—Testing

Figure 7:
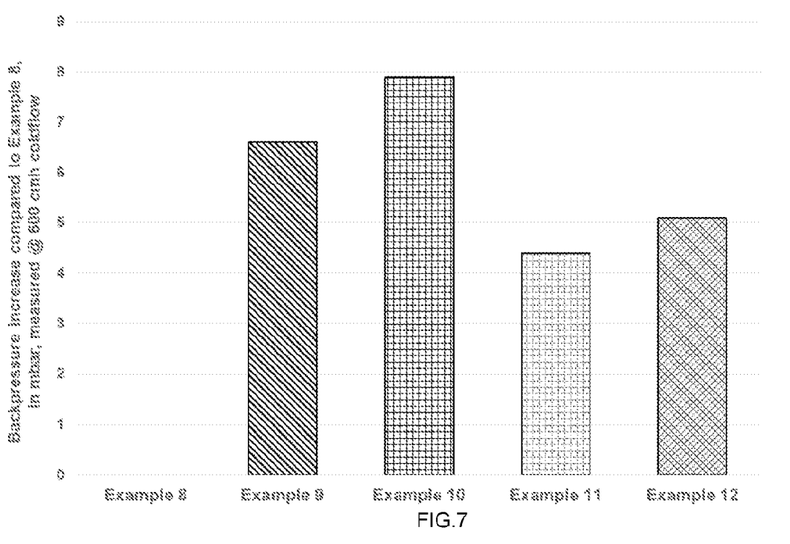
FIG. 7 shows a plot of backpressure characteristics of coated particulate filters according to embodiments of the present invention and a comparative particulate filter.

Backpressure characteristics of the above coated gasoline particulate filter examples (Examples 8 to 12) were investigated under cold air-flow at 600 cubic meter per hour (cmh). The results are shown in FIG. 7. Like previous examples, filters applied with the functional material layer exhibited slight increase in backpressure compared to a prior-art catalyzed gasoline particulate filter. In addition, at same functional material layer weight ratio, boehmite alumina material are slightly more effective in reducing backpressure of the final filter compared to magnesium oxide material (Examples 9 & 11 vs. Examples 10 & 12).

Figure 8:
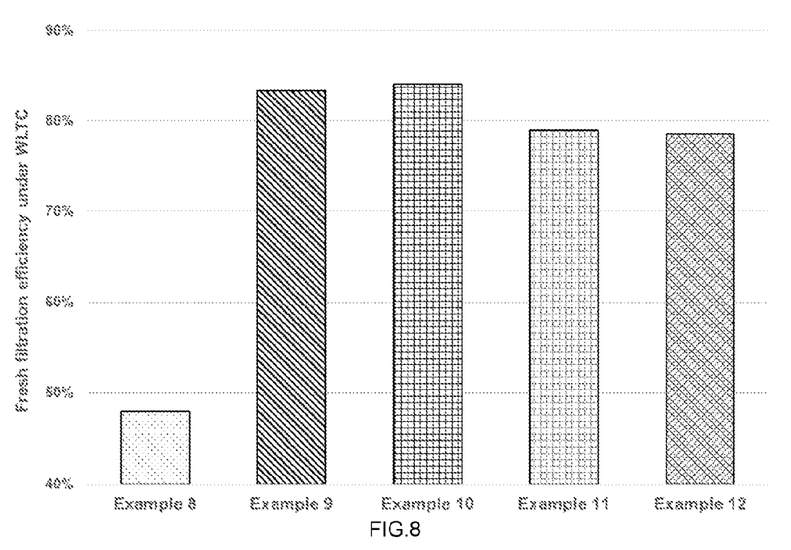
FIG. 8 shows a plot of filtration efficiencies of coated gasoline particulate filters according to embodiments of the present invention and a comparative particulate filter.

The filtration efficiencies of the above coated gasoline particulate filter examples at fresh state (0 km, or out-of-box state) were measured in the first close-coupled position (SGE 1.5 L turbo gasoline direct injection engine; WLTC testing; PN engine out=$3.5\times10^{12}$ #/km), and the results are shown in FIG. 8. Again, all coated gasoline particulate filter applied with the functional material layer exhibited significant increase in fresh filtration efficiency compared to a prior-art filter in which no functional material layer had been applied onto. Noticeably, at same functional material layer weight ratio, filters with boehmite alumina material and with magnesium oxide material didn't show difference in fresh filtration efficiency.

The invention claimed is:

1. A coated particulate filter for exhaust gas treatment from an internal combustion engine comprising:
   a particulate filter, wherein the particulate filter having an inlet side and an outlet side, the particulate filter comprising a porous body comprising a plurality of pores; and
   a functional material layer coated onto the inlet side, the outlet side, or both sides of the particulate filter, the function material layer includes a first inorganic material and a second inorganic material;
   wherein the first inorganic material has a $D_{50}$ smaller than an average pore size of the plurality of pores, and the second inorganic material has a $D_{50}$ larger than the average pore size of the plurality of pores.

2. The coated particulate filter according to claim 1, wherein:
   the first inorganic material comprising one or more of alumina, zirconia, ceria, silica, titania, a rare earth metal oxide other than ceria; and
   the second inorganic material comprising one or more of alumina, zirconia, ceria, silica, titania, magnesium oxide, zinc oxide, manganese oxide, silicate zeolite, alumino silicate zeolite.

3. The coated particulate filter according to claim 2, wherein the functional material layer further comprises a first platinum group metal (PGM) chosen from platinum (Pt), palladium (Pd) and rhodium (Rh), and mixtures thereof.

4. The coated particulate filter according to claim 2, wherein the second inorganic material has a $D_{50}$ ranging from 10 μm to 200 μm.

5. The coated particulate filter according to claim 4, wherein the second inorganic material has a $D_{50}$ ranging from 50 μm to 150 μm.

6. The coated particulate filter according to claim 2, wherein a weight percentage of second inorganic material in the functional material layer ranges from 1% to 25%.

7. The coated particulate filter according to claim 6, wherein a weight percentage of second inorganic material in the functional material layer ranges from 5% to 20%.

8. The coated particulate filter according to claim 2, wherein a loading of the second inorganic material is ranges from 0.05 g/L to 5 g/L.

9. The coated particulate filter according to claim 8, wherein a loading of the second inorganic material is ranges from 0.1 g/L to 2 g/L.

10. The coated particulate filter according to claim 2, wherein the first inorganic material has a $D_{50}$ ranging from 1.2 μm to 8 μm.

11. The coated particulate filter according to claim 10, wherein the first inorganic material has a $D_{50}$ ranging from 1.8 μm to 6 μm.

12. The coated particulate filter according to claim 1, wherein the particulate filter further comprises a catalytic washcoat within at least a portion of the plurality of pores, wherein the catalytic washcoat comprises one or more of a selective catalytic reduction (SCR) catalyst, a diesel oxidation catalyst (DOC), a three-way conversion (TWC) catalyst, an AMOx catalyst, a NOx trap, a NOx absorber catalyst, a hydrocarbon trap catalyst;
    wherein the catalytic washcoats are applied to the particulate filter prior to application of the functional material layer.

13. The coated particulate filter according to claim 1, wherein the functional material layer is coated in a particulate form.

14. The coated particulate filter according to claim 13, wherein the functional material layer is coated in a particulate form via gas phase carrier.

15. A method for the treatment of exhaust gas from an internal combustion engine comprising:
    the coated particulate filter according to claim 1, and
    flowing the exhaust gas from the engine through the coated particulate filter.

16. The method according to claim 15, wherein the exhaust gas comprises unburned hydrocarbons, carbon monoxide, nitrogen oxides, and particulate matter.

* * * * *